United States Patent [19]

Herman et al.

[11] 4,360,995

[45] Nov. 30, 1982

[54] INTRODUCING ELONGATED MAGNETIC ARTICLES INTO CONTAINERS

[75] Inventors: Carl H. Herman, Fleetwood; Anderson F. Johnson, Jr., Sinking Spring; Donald M. Large, Temple; Joseph A. Tamashasky, New Philadelphia, all of Pa.

[73] Assignee: Western Electric Co., Inc., New York, N.Y.

[21] Appl. No.: 208,450

[22] Filed: Nov. 19, 1980

[51] Int. Cl.³ .................. B65B 1/22; B65B 35/56; B65B 39/00; B65B 43/59

[52] U.S. Cl. .................................. 53/437; 53/148; 53/236; 53/250; 53/266 R; 53/381 A; 53/444; 53/468; 53/525; 53/500

[58] Field of Search .............. 53/437, 468, 475, 500, 53/525, 236, 244, 248, 250, 266 R, 247, 148, 150, 381 A, 444

[56] References Cited

U.S. PATENT DOCUMENTS

| | | | |
|---|---|---|---|
| 1,080,435 | 12/1913 | Gamper | 53/236 X |
| 2,602,942 | 7/1952 | Otto | 53/475 |
| 3,087,290 | 4/1963 | Odell | 53/236 X |
| 3,120,890 | 2/1964 | Waltz | 198/381 |
| 3,537,580 | 11/1970 | Beroset | 209/907 X |
| 3,585,782 | 6/1971 | Staley | 53/244 X |
| 3,618,819 | 11/1971 | Blackburn | 53/500 X |
| 3,741,436 | 6/1973 | Hartline et al. | 221/156 |
| 3,742,678 | 7/1973 | Wyatt | 53/236 |
| 4,209,959 | 7/1980 | Bachman et al. | 53/475 |
| 4,262,805 | 4/1981 | Bankes et al. | 209/656 |

OTHER PUBLICATIONS

Beroset, John E. et al., "Magnetic Suspension Parts Handling," *The Western Electric Engineer*, Jul. 1967, vol. XI, No. 3, pp. 36 et seq.

Bankes, K. E. et al., "Moving Articles Through Descending Magnetic Fields," *Technical Digest*, Western Electric, No. 57, Jan. 1980, pp. 1-2.

Herman, C. H. et al., "Diode Handling Trays," *Technical Digest*, Western Electric, No. 58, Apr. 1980, pp. 23-24.

Primary Examiner—John Sipos
Assistant Examiner—Charles L. Willis
Attorney, Agent, or Firm—D. C. Watson

[57] ABSTRACT

An off-line system for handling elongated magnetic articles such as axially leaded diodes 12 includes a magnetic receiving chute 20, a blocking mechanism 45, a magnetic loading station 75 for supporting at least one tray 55 and for loading diodes 12 therein, and a drive train 115. The chute 20 receives the diodes 12 and guides such diodes downwardly to an outlet 24 and the tray 55. Over a major accessible face of the tray 55 a cover 63 is slidably removable from a second end 60. At the loading station 75, the tray 55 is disposed in an upright manner resting on the second end 60 at a first elevation with a first end 59 extending at least to the outlet 24 of chute 20. An elevating mechanism 80 applied to the end 60 elevates tray 55 to a second elevation, while the cover 63 remains at about the first elevation. A portion of tray 55 is thereby opened adjacent the first end 59 which opening abuts to and registers with the outlet 24 of chute 20. The blocking mechanism 45 has stored diodes 12 in chute 20 while a tray 55 has been changed and mechanism 45 now releases the diodes 12 which are introduced into tray 55. Loading station 75 includes magnetic assemblies 100 and 108 which maintain orientation of the diodes 12 as they are loaded into a tray 55. When a machine count indicates that tray 55 is loaded, the mechanism 45 blocks further advancement of diodes 12 in chute 20. A ram mechanism 95 pushes the tray 55 downwardly to the first elevation while the cover 63 is slidably closed therealong. In a computer controlled operation, the drive train 115 advances the loaded tray 55 away from and an empty tray 55 into the loading station 75 to continue the loading with a minimum of operator attention.

27 Claims, 7 Drawing Figures

INTRODUCING ELONGATED MAGNETIC ARTICLES INTO CONTAINERS

TECHNICAL FIELD

This invention relates to introducing elongated magnetic articles into containers. More particularly, this invention relates to introducing elongated magnetic articles into a vertical, open portion of an upright container for off-line storage of such articles.

BACKGROUND OF THE INVENTION

The production of elongated magnetic articles, such as axially leaded diodes, often involves successive treatment processes which are quite different in nature. Such processes may, for example, include lead straightening, sorting, parametric testing, coding, and packing. The machines developed for such treatment processes typically have widely disparate operating rates for many reasons. Some processes such as lead straightening and testing are expected to disclose or produce some defective diodes. Some processes such as taping require lengthy interrupt periods to develop leader or trailer tape and to manually change reels. Nevertheless, it is expected that each machine will produce at least a minimum hourly output set for a given production line. The problem is to link the machines together while providing for the disparate rates of operation.

To link a faster operating machine to a slower machine, it is essential to collect excess diodes in an off-line handling system. A similar need obtains when a downstream machine is not functioning. Conversely, to link a slow operating machine to a faster machine, it is essential to supplement the diode input to achieve full use of the machinery. Consequently, in the integration of treatment processes, an off-line handling system is needed to collect, to store, and later to supplement an input to a machine without damage to the articles, especially to wire-like leads which are easily bent in handling.

An off-line handling system should include suitable containers for storing diodes and suitable expedients located between the line and the containers to efficiently introduce and remove diodes therefrom. In an article entitled "Diode Handling Trays," Western Electric, *Technical Digest*, No. 58, April 1980, Page 23, the features of a preferred diode container are disclosed. The body portion is rectangular in plan, profile, and cross-section and is adapted for stacking one upon another. The container is called a tray because a major face is fully accessible although the face is normally closed by a cover slidably removable from one end. A preferred technique for supplementing diodes from such a container is described in an article entitled "Moving Articles Through Descending Magnetic Fields," Western Electric, *Technical Digest*, No. 57, Jan. 1980, Page 1. A tray full of diodes having the cover fully closed is inverted in a magnetic field. The field maintains diode orientation as the cover is slidably removed and the diodes are released into a magnetic feed bin. Neither the above references nor other known references disclose a technique for introducing diodes into such a container.

SUMMARY OF THE INVENTION

In view of the foregoing, it is an object of this invention to provide new and improved apparatus and methods for introducing elongated magnetic articles into containers. Another object is to introduce elongated magnetic articles into a container having a slidable cover. A further object is to introduce such articles into such containers without significant operator attention.

With these and other objects in mind, the present invention includes apparatus for introducing elongated magnetic articles into a container of the type having first and second side plates spaced apart sufficiently to accommodate at least the length of an article therebetween. A first and a second end plate are provided and, over an accessible face of the container, a normally closed cover, slidably removable from the second end. A chute for receiving the articles has first and second sidewalls including apparatus therein for orienting the articles transversely therebetween. The chute is inclined from an upper inlet end to a lower end having a substantially vertically disposed outlet. The container is supported on the second end plate at a first elevation and the first end extends in an upright manner at least to the lower end of the chute for receiving articles therefrom. A loading station includes magnetic apparatus depending proximately from the sidewall ends of the chute along each side plate of the upright container to at least the first elevation. The magnetic apparatus maintains the orientation of the articles laterally introduced into the container. The loading station also includes apparatus for elevating the container to a second elevation and for holding the slidable cover at about the first elevation. A portion of the accessible face of the container is thereby opened adjacent to the first end and the opened portion abuts and substantially registers with the outlet from the chute.

In a further embodiment, the chute has a roof member including a blocking mechanism therein. A blocking member is extendable downwardly in the chute sufficient to block the downward advancement of articles toward the outlet end when containers are being changed. The member is located sufficiently upward of the outlet to provide adequate gravitational momentum when blocked articles are subsequently released to overcome any impeding boundary forces at the end of the first magnetic field by the momentum of the downwardly advancing articles.

In another embodiment, a drive train is provided to advance a container in the upright position along a path at the first elevation from a storage area for empty containers to the loading station and therefrom to a storage area for loaded containers. A further embodiment includes a control system responsive to a count of articles introduced into the container. The system controls blocking subsequent articles in the chute, lowering a loaded container to the first elevation, thereby closing the cover, advancing a loaded container away from the loading station, advancing an empty container to the loading station, elevating such container to the chute outlet, and releasing blocked articles, all with a minimum of operator attention.

BRIEF DESCRIPTION OF THE DRAWINGS

The above-described and other objects, advantages, and features of the invention will be more readily understood from the following detailed description when read in conjunction with the accompanying drawing, wherein.

Figure 1:
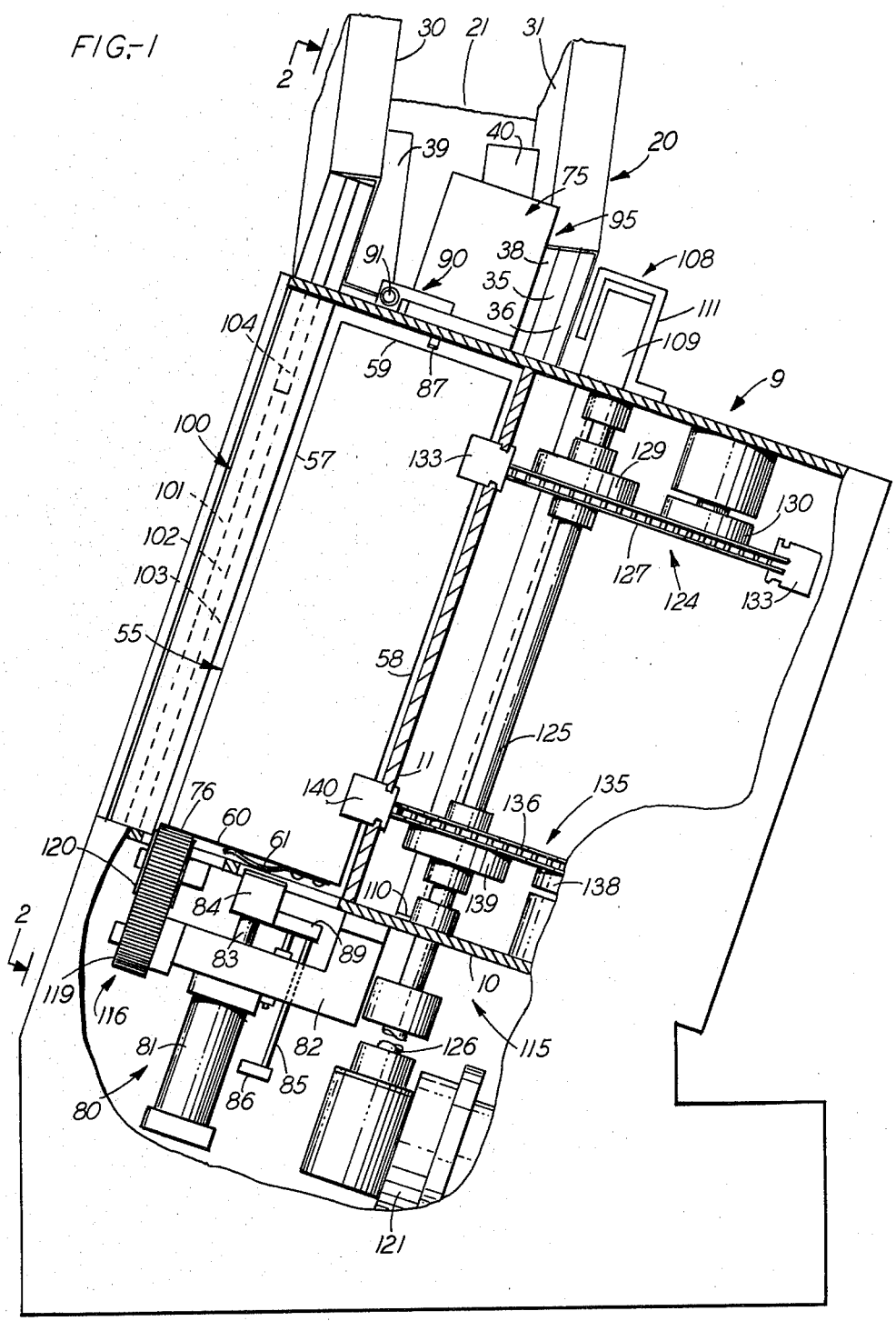
FIG. 1 is a side elevational view with portions cut away of an off-line system for handling diodes in accordance with the instant invention.

It can be seen that some elements in the figures are abbreviated or simplified to highlight certain features of the invention. Also, where appropriate, reference numerals have been repeated in the figures to designate the same or corresponding features in the drawing.

DETAILED DESCRIPTION

General Arrangement

Figure 2:
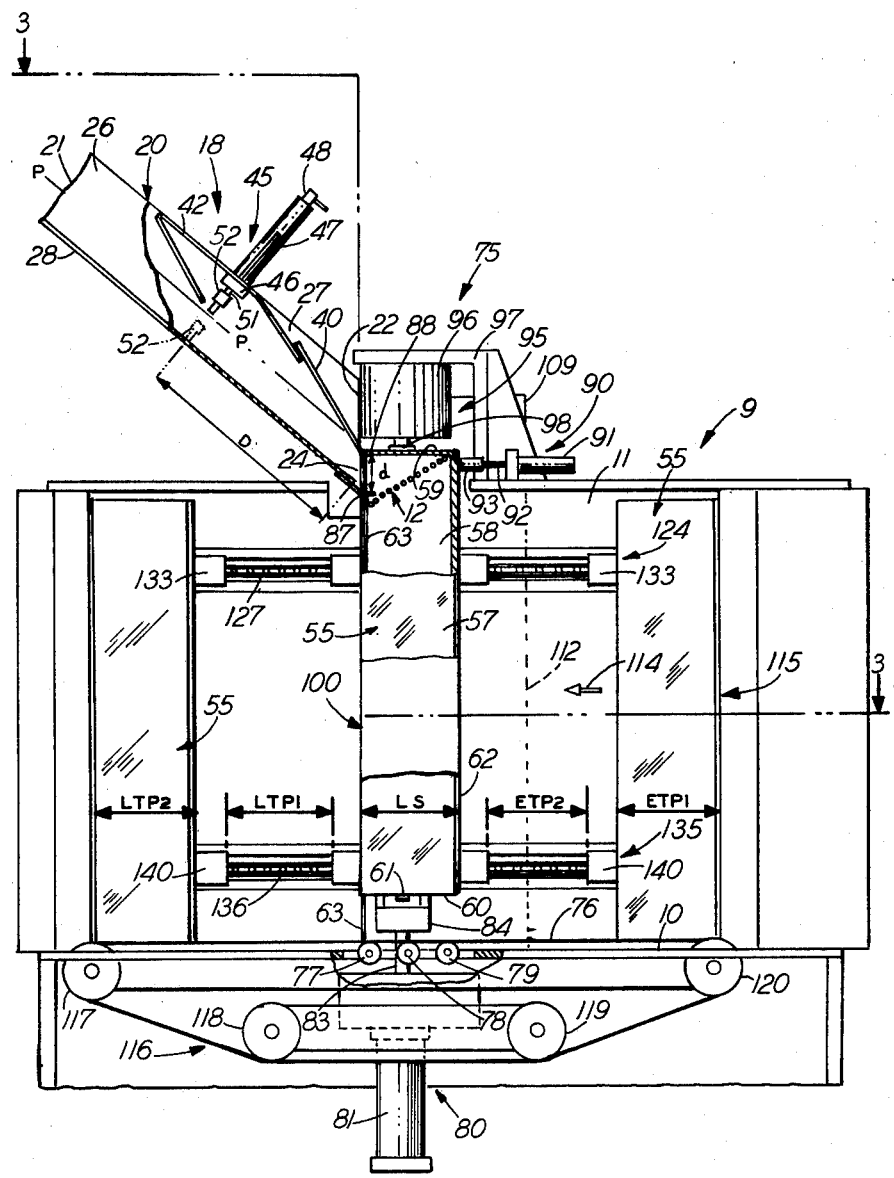
FIG. 2 is a front, auxiliary view, with portions omitted or cut away, of apparatus shown in FIG. 1, taken along line 2—2.
Figure 3:
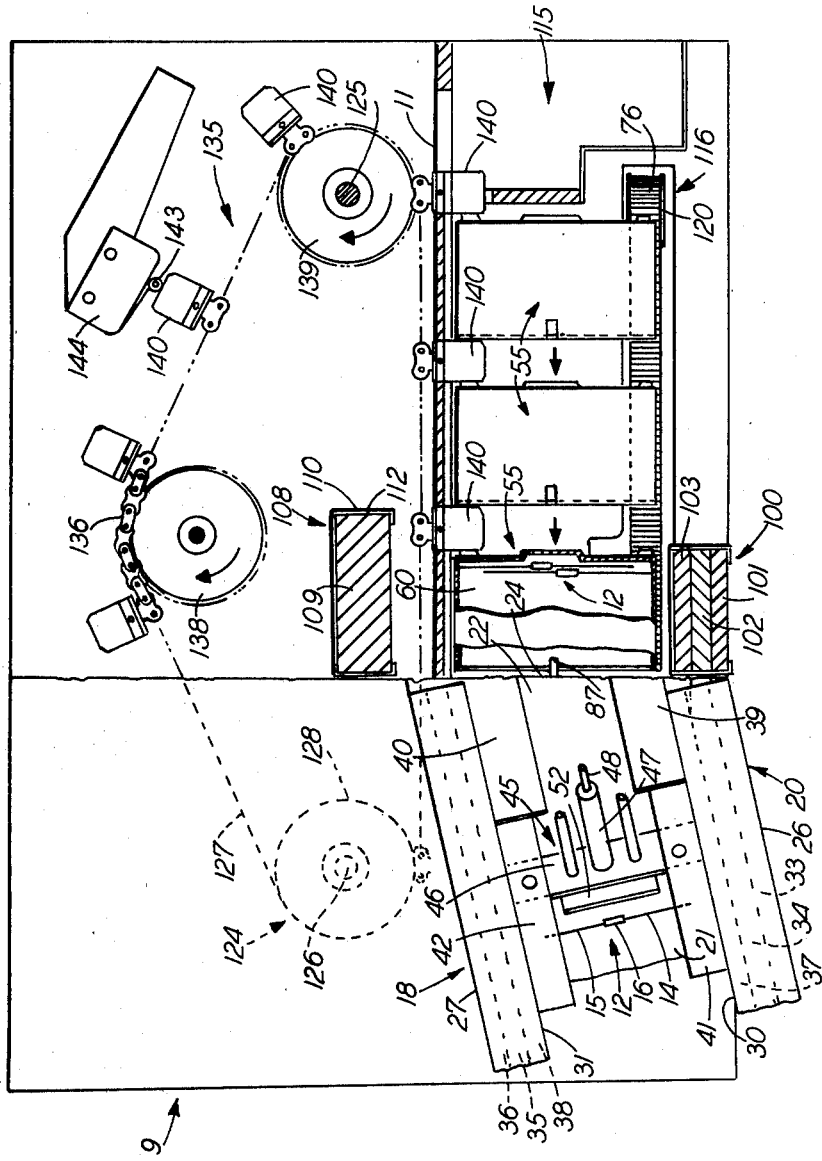
FIG. 3 is an auxiliary view, partly in plan and partly in cross-section, of apparatus shown in FIG. 2, taken along line 3—3.

The present invention is preferably embodied in an off-line diode handling system essentially contained within a cabinet designated generally by the numeral 9 as shown in FIGS. 1, 2, and 3. Cabinet 9 includes support members shown at each end thereof and numerous other features not relevant to an understanding of the invention. However, a main floor plate 10 will be referred to as supporting apparatus germane to the invention, as will a bulkhead 11 which is canted away from a vertical line for reasons which will be discussed later. For simplicity, FIGS. 2 and 3 are drawn as auxiliary views because of the canted aspect of cabinet 9 and bulkhead 11 and the apparatus that is associated therewith.

The off-line system may serve an unseen overhead article treating operation, such as a diode sorter, tester, or coder, from which articles are to be diverted off the production line. The system includes a receiving and feeding assembly designated generally by the numeral 18 (FIG. 2), a diode blocking mechanism designated generally by the numeral 45 (FIGS. 2 and 3), a loading station designated generally by the numeral 75 (FIGS. 1 and 2) to support at least one container designated generally as tray 55, and a container drive train designated generally by the numeral 115. There is also included a control system (not shown) which will be described hereinafter.

The Elongated Magnetic Articles

In each of FIGS. 2, 3, 4, and 5 there is shown at least one elongated magnetic article 12 which is introduced into a container in the practice of this invention. For purposes of illustration, the articles 12 will often be identified and referred to as axially leaded diodes 12. However, it will be appreciated that other elongated magnetic articles 12 can as well be handled in the practice of the invention.

Referring again to FIG. 3, the diode 12 is seen to have wire-like leads 14 and 15 extending in opposite directions, typically in a collinear manner, from a generally central, body portion 16. In an illustrative example, which will be referred to hereinafter unless otherwise specified, a typical diode 12 is assumed to be about 3.375 inches long and weigh about 0.243 grams. Each lead 14 or 15 is about 0.020 inches in diameter and about 1.563 inches long. The body 16 is cylindrical in shape, being about 0.120 inches in diameter and about 0.250 inches long.

The body 16 contains an electronic device (not shown) which has a cathode connected to one external lead such as lead 14 and, in this example, an anode connected to the other external lead 15. The diode 12 is thus directionally sensitive from a polarity standpoint although such polarity typically cannot be discerned by visual observation of the shape of the diode 12.

The leads 14 and 15 and certain parts of diode 12 within the body 16 are made of a magnetic material; i.e., a material which is attracted to a magnet. Therefore, diodes 12 are affected by magnetic forces and magnetic apparatus is advantageously used to manipulate such diodes.

The Receiving and Feeding Assembly

Referring to FIGS. 2 and 3, there can be seen the receiving and feeding assembly 18 for receiving diodes from a production line and for feeding them into a tray 55. The assembly 18 includes a chute designated generally by the numeral 20 and the diode blocking mechanism 45 mounted on chute 20. The chute 20 is inclined from an upper inlet end 21 to a lower end 22 having a substantially vertically disposed outlet 24. Chute 20 has a first, front sidewall 26 and a second, rear sidewall 27, held in a spaced parallel relationship by a floor member 28 (FIG. 2). The sidewalls 26 and 27 have confronting inside faces 30 and 31 (FIG. 3), respectively, typically spaced apart a distance slightly greater than the length of a diode 12 measured between the outer tips of leads 14 and 15. For example, given the illustrative diode 12 having an overall length of 3.375 inches, the distance between faces 30 and 31 may be set at about 3.438 inches. This setting provides suitable fabrication tolerances for both the diodes 12 and the chute 20.

The sidewalls 26 and 27 include a system of magnets therein to orient the articles 12 transversely between the inside faces of the respective sidewalls. For example, sidewall 26 includes magnets 33 and 34 (FIG. 3) and sidewall 27 includes magnets 35 and 36, each of which extends for substantially the full length of a respective sidewall. The arrangement of such magnets and the characteristics of a first magnetic field generated thereby are adequately described elsewhere, for example, in copending patent application Ser. No. 65,031, filed Aug. 9, 1979, now U.S. Pat. No. 4,262,805, and assigned to the assignee of the instant application which is hereby incorporated herein by reference. It is believed sufficient here to point out that the first magnetic field in chute 20 is not as strong as is typically provided in a feed bin or a chute for distinguishing between shapes of articles. The purpose of chute 20 is primarily to receive diodes 12 and to guide them downwardly to outlet 24 while maintaining their orientation. Outlet 24 is located below a plane P—P (FIG. 2) passing through sidewalls 26 and 27 at about the midpoint in their height measured perpendicular to the chute. It is known that the diodes 12 will seek a position along plane P—P with a propensity that varies according to the strength of the first field. To facilitate guiding the diodes into outlet 24, such field should not unduly bias the diodes toward plane P—P.

Consequently, each magnet is selected to be about 0.375 inches thick, providing a composite magnet which is about 0.750 inches thick in each sidewall. Also, space filling members 37 and 38 (FIG. 3) of non-magnetic material are provided in sidewalls 26 and 27, respectively, to adjust the distance between magnets and the resulting field strength. The first field thus established between and transverse to sidewalls 26 and 27 is of sufficient strength relative to the weight and material of diodes 12 to orient and suspend the diodes therebetween. Nevertheless, the first field permits the diodes 12 to be deflected downwardly in the chute 20 by the natural momentum of their advancement through the chute and by physical deflection therealong.

For such deflection, a pair of baffle plates 39 and 40 are provided in chute 20 (FIG. 3), tapering downwardly to the outlet 24 to guide the diodes 12 toward such outlet. Such plates 39 and 40 also control the height of outlet 24 (FIG. 2) to substantially coincide with an outage distance in a container as will be explained later. Another pair of baffle plates 41 and 42 (FIG. 3) guide the diodes 12 downwardly in the chute at blocking mechanism 45. Each plate 41 or 42 is advantageously formed in a singular strip and bent to provide a baffle portion upstream and a portion downstream of mechanism 45 as is shown most clearly in FIG. 2.

Blocking mechanism 45 is supported on chute 20 by a transverse roof member 46 (FIG. 2). Mechanism 45 includes an air cylinder 47 to which is attached a tube fitting 48 for introducing compressed air from a source (not shown) into cylinder 47. Cylinder 47 is threadably inserted into member 46 and a piston 51 is driven therefrom toward the floor 28 of chute 20 by cylinder 47. The piston 51 attaches to and advances a blocking member 52 downwardly as shown in phantom lines, to block the downwardly advancement of articles when containers are being changed.

An article 12 moves through chute 20 preferably under the force of gravity which, taken with the mass of an article, causes momentum to build up as the article moves downwardly. Such momentum should be adequate when the article advances to outlet 24 to overcome the known boundary effects of the first magnetic' field. Such effects tend to impede such advancement or to retain an article within the magnetic field.

In the illustrative example best shown in FIG. 2, the chute 20 is inclined at about 40 degrees above a horizontal plane. The gravitational force provided by such inclination, taken with the weight of the illustrative diode 12, provides adequate momentum to escape the field when a diode 12 advances from inlet end 21 to the outlet 24. However, when the diodes 12 are blocked by member 52 a certain amount of potential momentum is depleted, depending upon the position of member 52. Consequently, in the illustrative example, it is appropriate to locate member 52 sufficiently upward of the outlet 24 to provide a desired momentum when blocked diodes 12 are subsequently released. Such momentum should overcome any impeding boundary forces at the end of the field to speedily advance the diodes through outlet 24. In the illustrative example, it has been found appropriate to locate member 52 such that dimension "D" is about 5-6 inches in the practice of the invention.

The Containers

Axially leaded articles such as diodes 12 are a challenge to handle because they are light and resilient and tend to mix easily. Stainless steel trays, cardboard cartons and open trays having magnetic sidewalls have typically been used for handling these diodes. However, a thin walled, aluminum tray 55 shown in FIGS. 1–5, provides significant advantages because it is light in weight and can accommodate a large number of diodes 12, as will be explained hereinafter.

As seen in FIG. 2, tray 55 has a body portion which includes a front side plate 57 and a rear side plate 58 spaced apart sufficiently to accommodate at least the length of a diode 12 therebetween. A first end plate 59 is located at the top in FIG. 2 and a second end plate 60 is located at the bottom, including an identification and orientation clip 61 attached to end plate 60. Over one major surface of tray 55, a plate appears which will be referred to as a bottom plate 62 because tray 55 is normally stored in a horizontal position whereby the contents bear primarily on such bottom plate 62. Over another major face which affords access to tray 55, a normally closed cover 63 is shown which is slidably removable from the second end 60.

Figure 5:
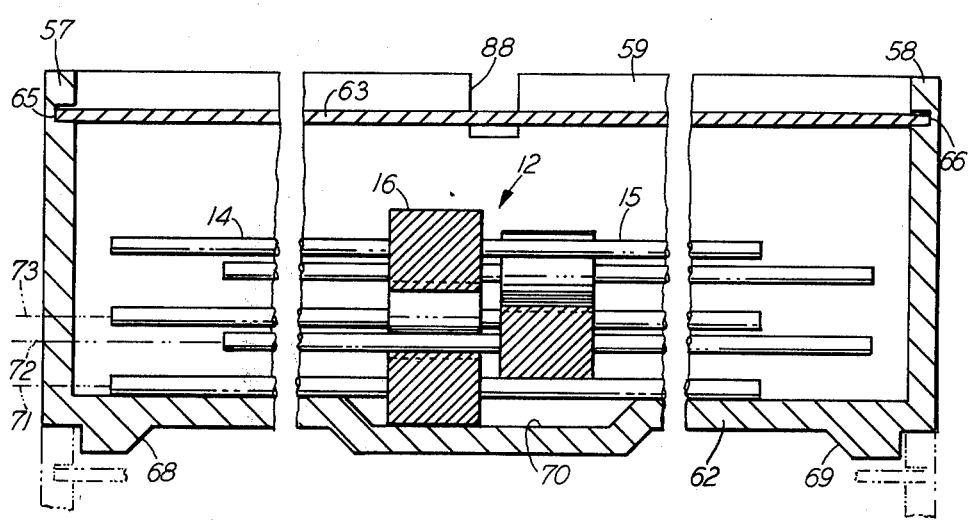
FIG. 5 is a cross-sectional view of the tray shown in FIG. 4, taken along line 5—5.

Additional features of tray 55, including at least one arrangement of diodes 12 therewithin, can be seen in FIG. 5. Note that cover 63 slides in grooves 65 and 66 formed into front side plate 57 and rear side plate 58, respectively. A front runner 68 and a rear runner 69 are made a part of bottom plate 62 to enable at least two trays 55 to be stacked one upon the other as shown by phantom lines. Running the full length of tray 55, a depressed center portion 70 is provided which is wide enough to receive at least the lengths of two bodies 16 of diodes 12 and deep enough so the leads 14 and 15 rest on the non-depressed portion of bottom plate 62.

In FIG. 5, the tray 55 is depicted with the side plates 57 and 58 preferably spaced apart sufficiently to receive at least a diode 12 and a body 16 of another diode 12 therebetween. Given an overall width of tray 55 as 4.00 inches and wall thicknesses of 0.125 inches, the inside width is 3.75 inches. Given an overall width of diode 12 as 3.375 inches and the length of a body 16 as 0.250 inch, a distance between plates 57 and 58 of at least 3.625 inches is desired so a residual distance of 0.125 inches is provided for clearances.

It will be appreciated that the dimensions given for tray 55 provide simple side-by-side compactness using only one type of repeat layers of diodes (not shown in the figures). For example, a first diode 12 in a first layer can be laid on plate 62 with its body 16 toward front side plate 57 and a second diode 12 in the same layer can also be laid on plate 62 with its body 16 toward rear side plate 58. Consequently, each staggered body 16 overlaps another body 16 in the layer and touches the leads 14 or 15 of an adjacent diode 12. Such layers are repeated and there is a significant advantage over non-staggered body-to-body layering.

Figure 4:
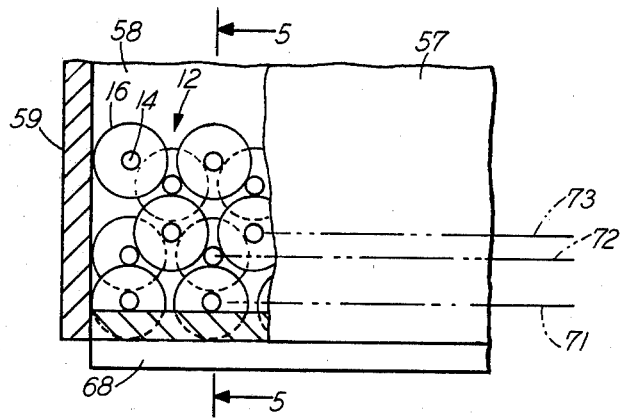
FIG. 4 is a cross-sectional view of a portion of a tray filled with diodes according to the instant invention, said view being taken longitudinally, between the bodies of the diodes and a side plate of the tray.

On the other hand, further compactness is achieved in the preferred arrangement shown in FIGS. 4 and 5 wherein three types of repeat layers are used. The diodes 12 in the first layer 71 are laid with their bodies 16, all disposed toward front side plate 57. Each diode 12 in a second layer 72 lies upon a lead of a diode 12 in the first layer 71 with first ends of bodies 16 in the second layer 72 facing second ends of bodies 16 in the first layer 71; i.e., the bodies 16 in the second layer 72 are disposed toward the rear side plate 58. Each body 16 of a diode 12 in the third layer 73 lies upon two leads of diodes 12 in the second layer 72, such body also lying substantially along a vertical plane passing between two bodies 16 in the first layer 71. Note that the bodies 16 in the third layer 73 are all disposed toward the front side plate 57. The layers 71, 72, and 73 are repeated and there is found a significant advantage in compacting diodes 12 into a container such as tray 55 using the preferred arrangement.

The Loading Station

Referring to FIG. 2, a tray 55 can be seen disposed in a substantially upright manner, resting on its second end plate 60. The first end 59 extends at least to the lower end 22 of chute 20 at the loading station 75. Station 75 is adapted to receive an empty tray 55, at a first elevation, to elevate an empty tray 55 to a second elevation while holding its cover 63 at about the first elevation, to maintain orientation of the diodes 12 as they are introduced into tray 55, to vibrate a tray 55 while it is being loaded, and to lower a loaded tray 55 while closing cover 63 therealong.

In FIG. 1, an empty tray 55 is shown at a first elevation at the loading station 75 where it is supported by a belt 76 and three idler rollers 77-79 (FIG. 2). The clip 61 is shown with a free end extending to the left in FIG. 1, indicating the direction of polarity of the diodes 12 to be loaded in the tray 55. An elevating mechanism designated generally by the numeral 80 comprises an air cylinder 81 mounted to a bracket 82 supported from the cabinet floor 10. Compressed air from a source (not shown) is fed into cylinder 81 to drive a piston 83 and a support block 84 in an upward manner against the second end plate 60 of a tray 55. As can be seen in FIG. 2, block 84 further includes two contact members separately mounted on block 84 to avoid pressure on clip 61. A stop mechanism 85 (FIG. 1) has end plates 86 and 89 which can be adjusted to control the elevation to which the mechanism 80 will elevate or lower a tray 55.

As mechanism 80 elevates an empty tray 55, as shown in FIG. 2, a finger 87 which extends from the floor 28 of chute 20 normally would bear against the first end plate 59. However, a notch 88 cut into the first end plate 59 of tray 55 permits it to pass finger 87, which then engages the first end of slidable cover 63 when such cover is elevated with tray 55. Consequently, cover 63 is held thereby so it remains substantially resting in contact with belt 76 at about the first elevation. Mechanism 80 continues to elevate the empty tray 55 such that a portion of the accessible face is opened adjacent to the first end plate 59. The opened portion abuts and substantially registers with the outlet 24 from chute 20.

On top of cabinet 9 there can be seen in FIG. 2, a vibrating mechanism designated generally by the numeral 90 for physically tapping tray 55 as diodes 12 are introduced therein. Mechanism 90 further includes an air cylinder 91 which drives a piston 92 to which is attached a bumper 93 made of a tough resilient material such as nylon. Air cylinder 91 is fed intermittent charges of compressed air from a source (not seen) so that a tray 55 is tapped and the diodes 12 therein are vibrated while a tray 55 is being loaded.

Also on top of cabinet 9 there can be seen a ram mechanism designed generally by the numeral 95 which cooperates with elevating mechanism 80 to lower a tray 55 after it is loaded with diodes 12. Mechanism 95 further includes a cylinder 96 mounted to a support bracket 97 and a piston ram 98 which contacts a first end 59 of a tray 55. When a tray 55 is loaded, mechanism 80 retracts its piston 83 in unison with mechanism 95 which extends its piston ram 98 such that a tray 55 is lowered in a positive manner and a cover 63 is slidably closed therealong.

It will be appreciated that in loading a tray 55 in the position indicated in FIG. 2, some unfilled space will occur within tray 55. Accordingly, a given outage distance "d" is prescribed at cover 63 above which diodes 12 are not introduced because they can cause jamming of cover 63 during a closing procedure. This outage distance conforms roughly with the height of the outlet 24 from chute 20. Nevertheless, diodes 12 are introduced into tray 55 beyond this distance at the first end of the bottom plate 62 to obtain maximum efficiency in filling tray 55.

When tray 55 is elevated as shown in FIG. 2, diodes 12 are introduced therein travelling in a lateral mode from chute 20. To maintain orientation of the entering diodes, a system of magnets is provided as shown in FIGS. 1 and 2. Such magnets depend proximately from the sidewall ends of the chute 20 along each side plate of the upright tray 55 to at least the first elevation. For example, a front assembly 100 includes 0.375 inch thick magnets 101, 102, 103, and 104 (FIG. 1). Magnet 101 abuts magnet 33 in chute 20 and extends downwardly to the floor of cabinet 10. The middle magnet 104 is an integral part and extension of chute magnet 34, and supplemental magnet 102 completes the extension at least to the first elevation. Magnet 103 is added as shown to get an overall thickness of about 1.125 inches for front assembly 100, and magnets 101-104 are each about 2.50 inches wide to adequately cover a 2.50 inch wide side plate 57 of a tray 55 with magnetic flux. A suitable material for magnets 101-104 and chute magnets 33-36 is that sold by 3M Company of Minneapolis, Minn., under the trade designation "Plastiform PL-1 or PL-1H."

At the rear of loading station 75, another magnetic assembly 108 can be seen, also depending as close to the rear side plate 58 as is practicable, given the space required for drive train 115 as will be explained later. Because of the required space between assembly 108 and side plate 58, a material having high residual magnetism is selected. A suitable material is sold by Indiana General Company, a Division of Electronic Memories and Magnetics Corporation, Valparaiso, Ind., under the trade designation "Index 1." A singular magnet 109 made of this material being 1.00 inch in thickness, 4.00 inches wide, and extending about 16 inches from about the elevation of the top of the chute magnets 35-36 to at least the first elevation is selected for assembly 108. Magnet 109 is held in place by a bottom sheet metal clip 110 and a top bracket 111 so magnet 109 can be removed to work on drive train 115.

By the provision of magnet 109, in combination with assembly 100, there is established within tray 55, between and transverse to side plates 57 and 58, a second magnetic field having unique characteristics. Such field is of sufficient strength relative to the weight and material of diodes 12 and to the conditions of their advancement from chute 20 to a rest position in tray 55 to maintain the lateral orientation therealong. However, the field is insufficiently inductive of magnetism, known to cause repelling forces between diodes, that the diodes rest in contact with each other under the force of gravity. Furthermore, it can be seen in FIGS. 2 and 3, that a face 112 of magnet 109 is disposed about 1.5 inches away from the bottom plate 62 of tray 55. There is thus created a bias in the field established between magnetic assembly 100 and assembly 108. Such bias in the second magnetic field is sufficient to avoid pressure along the slidable cover 63 from loaded diodes 12 when the tray 55 is lowered to the second elevation.

It will be appreciated that the diodes 12 take their rest positions within a tray 55 in response to the action of vibrating mechanism 90 in cooperation with several other factors. For example, the second magnetic field maintains lateral orientation and causes a slight suspension effect upon the diodes 12 but such field does not prevent longitudinal movement of the diodes. Therefore, as diodes 12 are loaded in a tray 55, constant compaction takes place by natural displacement until the diodes assume or come close to the ideal arrangement shown in FIGS. 4 and 5 and discussed previously. By calculation of how many diodes 12 a tray 55 can theoretically contain and by a machine count of loaded diodes, it has been determined that from about 90 to about 92% efficiency is attainable in loading the preferred tray 55.

The Tray Drive Train

By reference to FIGS. 1-3, it can be seen that empty and full trays 55 are advanced from the right to the left of cabinet 9 as indicated by arrow 114 in FIG. 2. Trays 55 are advanced mechanically by the drive train 115 which operates in a substantially automatic manner as will be explained later. Train 115 further comprises a belt system designated generally by the numeral 116, an upper, chain drive system designated generally by the numeral 124, and a lower, chain drive system designated generally by the numeral 135. Each system performs, in synchronization, some similar and other separate functions.

Belt system 116 includes a belt 76 extending along the first elevation for approximately the full width of cabinet 9 and returning thereunder over rollers 117-120 (FIG. 2). Roller 117 is incidentally driven by a sprocket wheel and a differential (neither seen) powdered by a motor 121, shown in FIG. 1, which is of a variable speed type. As previously explained, belt 76 is firmly supported at loading station 76 by idler rollers 77-79 to stabilize a tray 55 thereat.

Upper and lower chain drive systems 124 and 135, respectively, are similar in structure but are supported in an opposite hand manner. However, both systems have a common idler shaft 125 (FIGS. 1 and 3) and a common drive shaft 126 which is powered by the motor 121. System 124 further includes a chain 127 which passes over a drive sprocket wheel 128 and two idler sprocket wheels 129 and 130. Chain 127 further includes a plurality of tray push blocks 133 which are equally spaced along chain 127, so that a tray 55 fits snugly between a pair of blocks 133 when the chain 127 passes along bulkhead 11 of cabinet 9. It will be appreciated, in the canted arrangement shown in FIG. 1, that a tray 55 bears upon bulkhead 11 as such tray advances and the push blocks 133 serve both to locate a tray 55 in that upright position and to push it along a guided pathway.

Lower chain drive system 135 has a similar chain 136 driven by a similar sprocket wheel 137 (not shown) and such chain passes over similar idler sprockets 138 and 139. Also, similar push blocks 140 are equally spaced along chain 136 and each block 140 lies in the same vertical plane as an upper push block 133. Blocks 140 locate a lower portion of a tray 55 and assist in pushing the tray along with upper blocks 133.

In FIG. 3, there can be seen a spring-loaded roller 143 which actuates a switch counter 144 every time a lower push block 140 passes therealong. Lower drive system 135 and its counter 144 perform a useful tray locating function as will be explained in a system for controlling operation of the off-line handling system in a substantially automatic manner.

The Control System

Certain electromechanical devices are employed in operation of the invention which are well known in the art and are not shown in the figures. For example, each air cylinder 47, 81, 91, and 96 is provided compressed air through an unseen solenoid valve. A diode counter which is part of sorting, testing, or coding equipment counts the diodes 12 as they are fed into chute 20. Limit switches are provided at bulkhead 11 to be sure empty trays 55 are firmly seated in the drive train 115. Photocells are provided, aimed downward from overhead of the empty trays 55, to indicate whether positions between pusher blocks 133 or 140 are filled with empty trays 55 or whether a full tray 55 has advanced to the end of the cabinet 9. Other photocells perform other functions. For example, a photocell aimed horizontally across the top of elevated tray 55 at the loading station 75 signals that such elevated tray is in position for loading. A similar photocell is aimed downward into chute 20 at outlet 24 to signal that the opened portion of a tray 55 is unobstructed so that such tray 55 can be lowered when it is loaded.

These unseen devices provide information in the form of signals which could be used to light indicator lights or actuate audible alarms. In response thereto, an operator could actuate conventional air or electrical switches to control the system in a semi-automatic operation. However, in a substantially automatic operation, it is preferred to exploit the speed and versatility of a programmable, general purpose, microprocessor, for example, an EPROM Microcomputer sold by Intel Corporation of Santa Clara, Calif. as its Model No. 8748.

Figure 6:
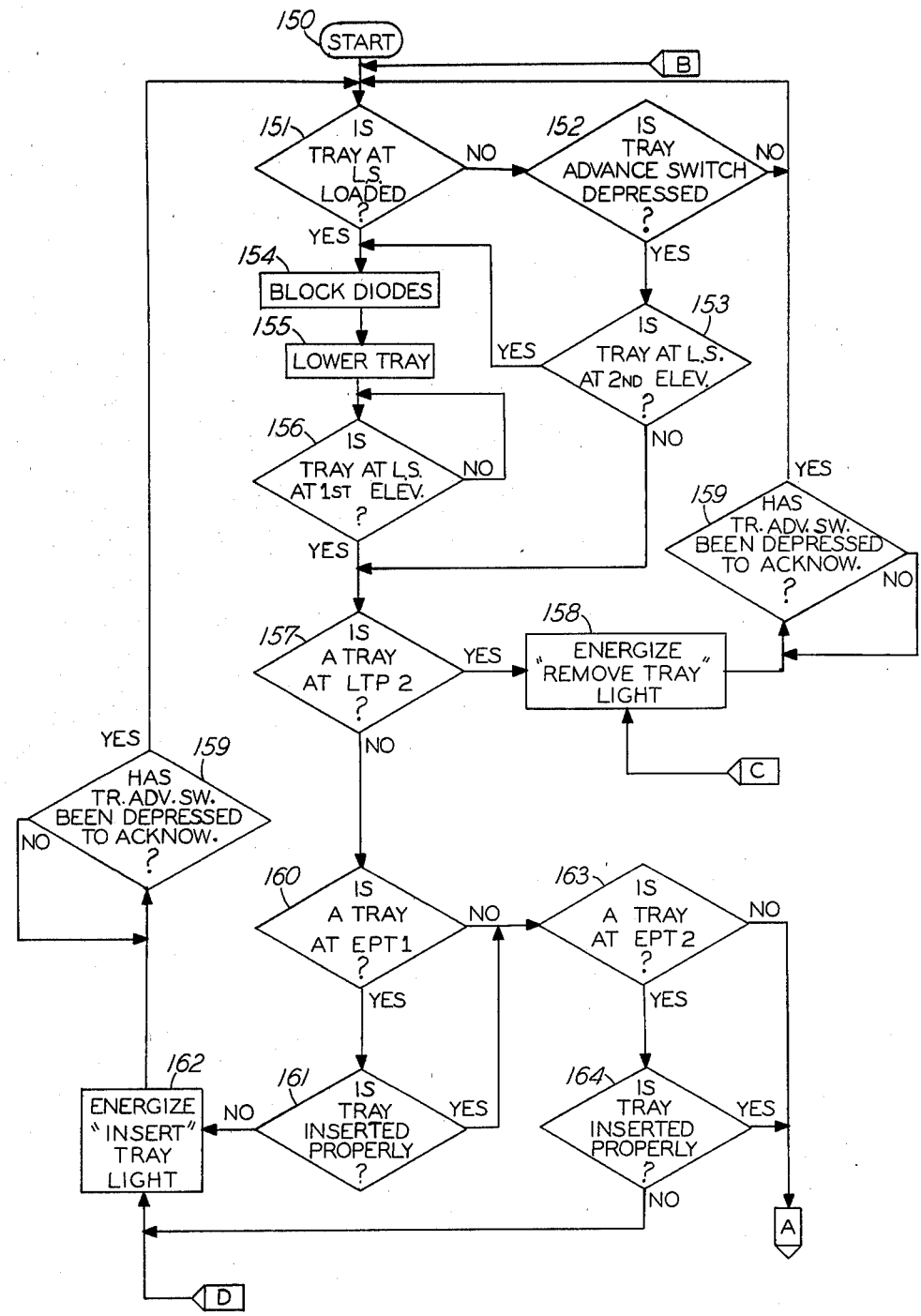
FIGS. 6–7 are flow charts of a routine by which a microprocessor controls an off-line system for handling diodes in accordance with an embodiment of the instant invention.
Figure 7:
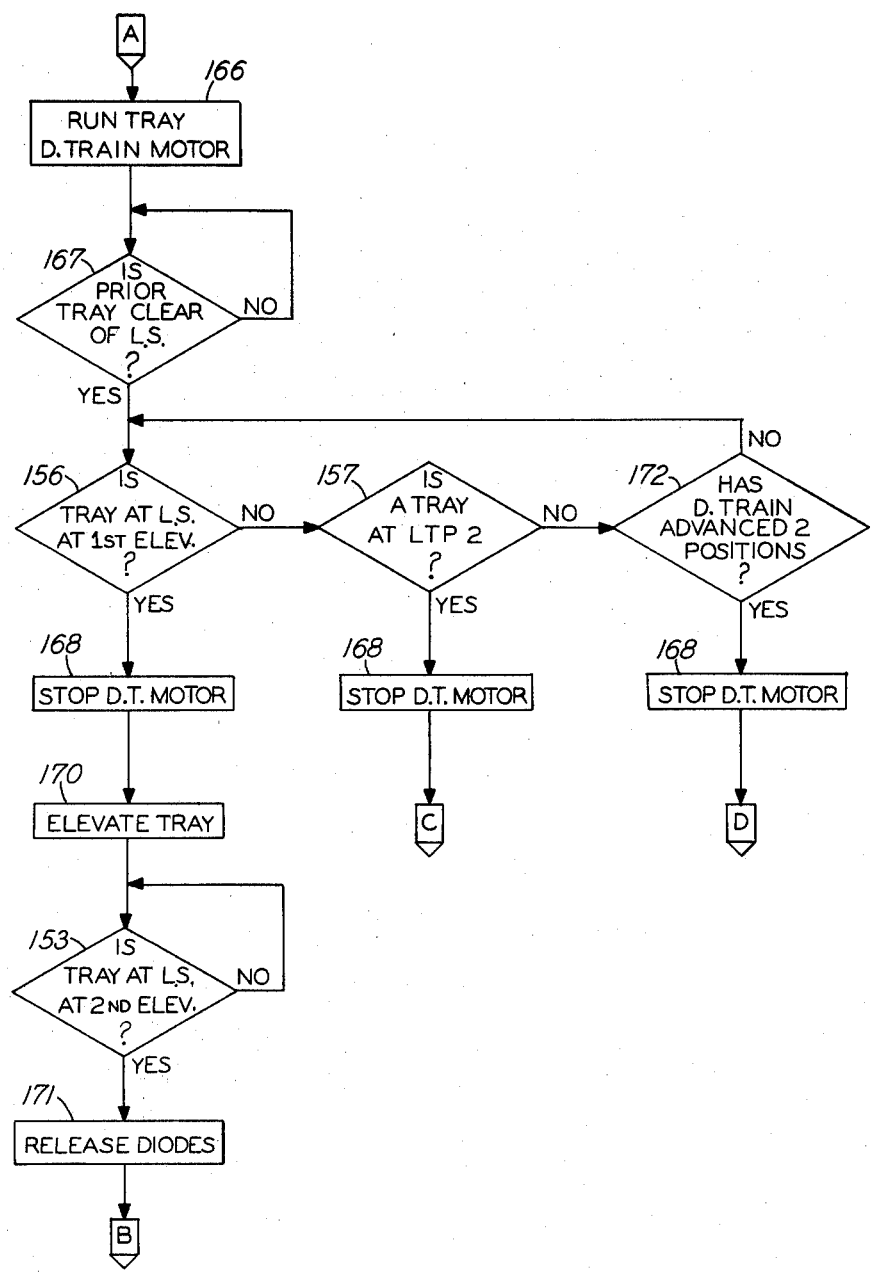

A preferred, abbreviated program comprising typical loops for operating said microprocessor is represented in the flow charts shown in FIGS. 6-7. The flow charts comprise a number of process blocks (PB) and decisional blocks (DB) representing respective microprocessor operations. Standard programming techniques, known in the art, can be employed to reduce the flow charts of FIGS. 6-7 into equivalent machine language in a known manner. It will be recognized that only the process-oriented portion of the overall program is represented by FIGS. 6-7. In addition, there is provided the customary system software including, for example, machine control, which are well known and not required for an understanding of the invention.

Referring to FIG. 6, the program can be seen starting at circuit terminal 150 and a substantially closed loop is thereby entered by assuming that a tray 55 is being loaded with diodes 12. Normally, tray 55 is not completely filled, but is loaded with a given practical number of diodes 12, for example, about 2700 in the illustrated tray 55 and the diode 12.

A count of the diodes 12 is made as each diode leaves the production line by the microprocessor in response to signals from line equipment. Consequently, DB 151 represents a determination of whether the desired count has been reached and if it has, then routine is provided to block diodes 12 in chute 20 and lower a loaded tray 55.

Sometimes, when different articles 12 are to be run, the loading will be stopped short of a full count. Accordingly, DB 152 asks that a data field be examined to see if the operator has depressed a tray advance switch (TR. ADV. SW.) to order loading to be stopped and for an empty tray 55 to be advanced. If the answer is negative, the loading continues, but if the answer is affirmative, another field is examined according to DB 153 to determine whether the partially loaded tray is at the second elevation, to determine if the lowering routine is necessary.

Under normal circumstances the top loop will represent continued and successive routine until a loaded count is reached and PB 154 and 155 are then successively used for further instruction. According to PB 154, a signal is sent to apply air pressure to cylinder 47 to extend piston 51 with member 52 to block advancement of diodes 12 in chute 20. Note, however, that diodes 12 continue to be received in chute 20 until a tray 55 is changed or until a known tolerable number of diodes 12 build up behind the blocking mechanism 45. In the illustrative example, the tolerable number of diodes 12 builds up in 6-9 seconds depending upon the type of process operation. If it takes longer than 9 seconds to change trays, the process equipment is shut down by overhead controls not a part of the instant invention.

After blocking the diodes 12, instruction is given according to PB 155 to stop vibrating mechanism 90, to relieve the pressure in elevating cylinder 81 and to apply air pressure to ram cylinder 96 to lower tray 55. It will incidentally be noted that a cover 63 on a tray 55 is positively opened as a tray 55 is elevated by the action of finger 87, notch 88 and the mechanisms 80 and 95. In similar manner, said cover is positively closed by the support of belt 76 and the action of mechanisms 80 and 95. Such positive action has been found advantageous because jamming can occur caused by particles accumulating in the grooves 65 and 66 of a tray or by warping of a cover 63 or both.

Upon examination according to DB 156, it is determined via input from a photocell that tray 55 has reached the first elevation. A portion of routine then controls the drive train 115 by examination of four tray positions best seen in FIG. 2 where two positions are left vacant for clarity. Prior to the loading station 75 (L.S. 75), there are two empty tray positions designated hereinafter as ETP 1 and ETP 2. After L.S. 75, there are two loaded tray positions designated hereinafter as LTP 1 and LTP 2. In the lower chain drive 135, the contact of pusher blocks 140 against roller 143 closes switch 144 signalling at a given instant that pusher blocks 133 and 140 are properly defining the tray positions. By input from a series of limit switches and photocells the control system determines the presence and proper insertion of a tray 55 in a given position. It is appropriate to note that when a tray 55 advances to LTP 2, the drive train 115 is stopped. Also, when at least one empty tray 55 is not present in ETP 1 or 2, the automatic and successive operation of L.S. 75 will eventually be interrupted.

Returning to FIG. 6, when a partially or fully loaded tray is at L.S. 75 at the first elevation, a field is examined according to DB 157 to be sure a tray is not at LTP 2. Of course, if a tray is at LTP 2, the drive train 115 cannot advance so a "remove tray" light is energized according to PB 158. An operator then removes the tray and depresses the tray advance switch to acknowledge the act according to DB 159.

Examination is then successively made according to DB 160 and DB 163 to see if a tray is at ETP 1 or 2, respectively, and if present, whether it is inserted properly according to DB 161 and DB 164. In either case, if a tray is present but not inserted properly, a light is energized according to PB 162, the operator repositions the tray, and depresses a tray advance switch to acknowledge that the program can proceed according to DB 159. Note at this point that the program will also proceed if neither ETP has a tray present.

Referring to FIG. 7 and connector "A," the drive train 115 is then advanced according to PB 166 by running motor 121. Such advancement is monitored according to DB 167 and DB 156 to clear L.S. 75 of a prior tray 55 and to advance an empty tray 55 to L.S. 75 at the first elevation. If a tray does not advance to L.S. 75, examination is made according to DB 157 to tell whether a tray is at LTP 2 and, if so, the drive train motor is stopped according to PB 168. Connector "C" is followed and clearance is made as was explained according to PB 158 and DB 159 in FIG. 6.

If a tray is not at L.S. 75 or at LTP 2, an examination is made according to DB 172 and input from switch 144 to tell whether three pusher blocks have successively closed the switch without an affirmative answer on examination according to DB 156 and DB 157. If so, it is then known that the drive train has advanced by two tray positions, and motor 121 is stopped (PB 168) to get the arrangement of drive train positions shown in FIG. 2 without trays 55 in place. Following connector "D" it can be seen that the drive train 115 will remain stopped and the "insert tray" light will be energized according to PB 162 shown in FIG. 6, until at least one tray has been inserted properly. Then acknowledgment is made by depressing the tray advance switch according to DB 159.

Returning to FIG. 7 and DB 156, if a tray 55 arrives at L.S. 75 after a prior tray is clear, the drive train motor 121 is stopped according to PB 168. The tray 55 is then elevated according to PB 170 until a photocell signals its presence at the proper second elevation and examination according to 153 confirms the routine. The diodes 12 are then released according to PB 171 and the routine continues as shown by connector "B" in FIG. 7.

The routine set forth in FIGS. 6-7 and described herein is seen to be illustrative of a control system by which computer technology is used in the practice of the invention. Nevertheless, it should be apparent that more conventional control systems could be used to automatically control the various functions so that operator attention is minimized.

Alternate Embodiments

It will be appreciated that many of the described features and aspects of the invention are considered preferable but not mandatory. For example, the trays are preferably canted away from a vertical line primarily to suit the design of drive train 115. Nevertheless, in a different design of a drive train, the trays could be advanced and loaded in a substantially vertical manner.

It will be observed that the magnetic assemblies 100 and 108 at loading station 75 are preferably not equal in strength, nor does such apply flux through a tray 55 in the same manner. Thus, the magnetic bias is created primarily by the magnet 109 and such bias is unsymmetrical with regard to a longitudinal midplane passing centrally through plate 62 and cover 63. Nevertheless, magnetic assemblies could be designed to create a symmetrical magnetic bias of diodes 12 away from a cover 63 in the practice of the invention.

In the arrangement shown in FIG. 1, it is convenient to locate vibrating mechanism 90 off-center of a longitudinal, midplane passing centrally through tray 55. The tapping blows from bumper 93 are thus seen to cause preferable unsymmetrical vibrating of diodes 12 in a tray 55. Nevertheless, other, more symmetrical vibration could be applied to the loaded diodes 12 if desired.

To a certain extent the unusual results obtainable in loading diodes 12 in a tray 55 are unexpected and are not completely understood. It will be appreciated that the placement of diodes 12 in a tray 55, as shown in FIGS. 4 and 5, is theoretical. Nevertheless, by actual count it is found that 90 to 92% of a theoretical capacity is typically attained by loading diodes 12 in a tray 55 in the practice of the invention. Consequently, it is theorized that at least three factors bear upon the advantageous placement of the diodes 12 in tray 55. For example, it can be seen in FIG. 3, that in a first layer of diodes 12 on end plate 60, the diodes take an initial staggered arrangement. In FIG. 4, it can be seen that this staggered arrangement (now appearing vertically) need be only slightly disturbed by the succeeding layers to get the preferred arrangement. Accordingly, it appears that loading in the upright condition, with an extensive upright stack of diodes 12 to assist compaction is a beneficial factor. It also appears that the unsymmetrical vibration and/or the unsymmetrical magnetic bias have an enhancing effect on the results obtained.

There have been illustrated herein certain embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for introducing elongated magnetic articles into at least one container having first and second side plates spaced apart sufficiently to accommodate at least the length of an article therebetween, first and second end plates, a bottom plate and, over an accessible face of the container, a normally closed cover, slidably removable from the second end, comprising:
   a chute for receiving the articles, said chute having first and second sidewalls including means therein for orienting the articles transversely therebetween and said chute being inclined from an upper inlet end to a lower end having a substantially vertically disposed outlet;
   means for supporting the container on the second end plate at a first elevation with the first end extending in an upright manner at least to the lower end of the chute for receiving articles therefrom;
   a loading station, including magnetic means depending proximately from the sidewall ends of the chute along each side plate of the upright container to at least the first elevation to maintain orientation of articles laterally introduced therewithin and including means for elevating the container to a second elevation and for holding the slidable cover at about the first elevation such that a portion of the accessible face is opened adjacent to the first end, said opened portion abutting and substantially registering with the outlet from the chute.

2. Apparatus as in claim 1, wherein the containers are loaded to within a given outage distance from the first end, further comprising, in the chute:
   a baffle plate tapering downwardly to the outlet end to guide the articles toward the outlet and to control the height of said outlet to substantially coincide with the outage distance in the container.

3. Apparatus as in claim 1, wherein the loading station further comprises:
   means, in cooperation with the elevating means, for lowering the container to the first elevation such that the cover is slidably closed therealong.

4. Apparatus as in claim 3, wherein the orienting means in the chute further comprises:
   means for establishing between and transverse to the first and second sidewalls of the chute, a first magnetic field of sufficient strength relative to the weight and material of the articles to orient and suspend such articles between the sidewalls.

5. Apparatus as in claim 4, wherein the chute has at least one roof member inclined therewith, further comprising:
   escapement means installed in the roof member, including a blocking member extendable downwardly in the chute sufficient for blocking the downwardly advancement of articles when containers are being changed, such blocking member being located sufficiently upward of the outlet to provide adequate gravitational momentum when blocked articles are subsequently released to overcome any impeding boundary forces at the end of the first magnetic field by the momentum of the downwardly advancing articles.

6. Apparatus as in claim 5, further comprising:
   means for advancing at least one container in the upright position along a path at the first elevation from a storage area for empty containers to the loading station and therefrom to a storage area for loaded containers.

7. Apparatus as in claim 6, wherein the upright container is canted by a given angle, in a lateral direction, away from a vertical line to better engage the means for advancing the container.

8. Apparatus as in claim 6, further comprising:
   means for counting articles introduced into the chute and therefrom into a container to determine a desired loaded condition within the container.

9. Apparatus as in claim 8, further comprising:
   means, responding to the count of articles introduced into the container, for controlling the blocking of articles in the chute, the lowering of a loaded container to the first elevation, thereby closing the cover, the advancing of a loaded container away from the loading station, the advancing of an empty container to the loading station, the elevating of such container to the chute outlet, and the releasing of blocked articles.

10. Apparatus as in claim 1, wherein the magnetic means for maintaining orientation at the loading station further comprises:
   means for establishing within the container, between and transverse to the side plates, a second magnetic field of sufficient strength relative to the weight and material of the articles and to the conditions of their advancement from the chute to a rest position within the container, to maintain lateral orientation of the articles therealong, said magnetic field being insufficiently inductive of magnetism causing repelling between articles that such articles rest in contact with each other under the force of gravity.

11. Apparatus as in claim 10, wherein the magnetic means for maintaining orientation at the loading station further comprises:
   means for at least partially biasing the second magnetic field away from the slidable cover to avoid pressure therealong from articles loaded in the container when the container is lowered to the second elevation.

12. Apparatus as in claim 1, further comprising:
   means for vibrating a container as articles are introduced therein to compactly position the articles therewithin.

13. Apparatus as in claim 8, wherein each article includes a generally central, body portion having a first end and a second end and each container further comprises:
   the first and the second side plate spaced apart sufficiently to accommodate at least one article and a body of another article therebetween such that, when at least three layers of articles occur, each article in a second layer lies upon a lead of an article in a first layer with the first ends of bodies in the second layer facing the second ends of bodies of the first layer and each body of an article in a third layer lies upon two leads of articles in the second layer, such body also lying substantially along a plane passing between two bodies in the first layer.

14. A method of introducing elongated magnetic articles into a container having a first and a second side plate spaced apart sufficiently to accommodate at least the length of an article therebetween, a first and a second end plate, a bottom plate and, over an accessible face of the container, a normally closed cover, slidably removable from the second end, comprising:
   receiving the articles within an inclined chute having first and second magnetic sidewalls such that the articles become oriented transversely therebetween, said articles advancing downwardly from an upper inlet end of said chute to a lower end, having a substantially vertically disposed outlet;
   supporting a container in an upright manner extending at least to the lower end of the chute at a station for loading articles from the chute, said container resting on the second end plate at a first elevation;
   elevating the container to a second elevation at the loading station while holding the slidable cover at about the first elevation, such that a portion of the accessible face is opened adjacent to the first end, said opened portion abutting and substantially registering with the outlet from the chute; and
   loading the container with articles from the chute while orienting the same with a system of magnets depending proximately from the sidewall ends of the chute along each side plate of the upright container to at least the first elevation.

15. A method as in claim 14, wherein the loading step further comprises:
   guiding the articles in the chute with a baffle plate tapering downwardly to the outlet end, thereby controlling the height of said outlet to substantially coincide with an outage distance in the container; and
   loading the container to about the given outage distance.

16. A method as in claim 14, further comprising, after the step of loading the container:
   lowering the container to the first elevation such that the cover is slidably closed therealong.

17. A method as in claim 16, wherein the receiving step further comprises:
   establishing between and transverse to the first and second sidewalls of the chute, a first magnetic field of sufficient strength relative to the weight and material of the articles to orient and suspend such articles between the sidewalls.

18. A method as in claim 17, wherein the chute has at least one roof member inclined therewith, including therein an escapement mechanism having a blocking member, further comprising:
   extending the blocking member downwardly in the chute sufficient to block the downwardly advancing articles when containers are being changed, such blocking taking place sufficiently upward of the outlet to provide adequate gravitational momentum when blocked articles are subsequently released, thereby overcoming any impeding boundary forces at the end of the first magnetic field by the momentum of the downwardly advancing articles.

19. A method as in claim 18, further comprising:
   advancing at least one container in the upright position along a path at the first elevation from a storage area for empty containers to the loading station and therefrom to a storage area for loaded containers.

20. A method as in claim 19, further comprising:
   canting the upright container by a given angle, in a lateral direction, away from a vertical line thereby engaging a drive train for advancing the container.

21. A method as in claim 19, further comprising:
   counting articles introduced into the chute and therefrom into a container thereby determining a desired loaded condition within the container.

22. A method as in claim 21, further comprising, in response to the counting of articles:
   machine controlling the blocking of articles in the chute, the lowering of a loaded container to the first elevation thereby closing the cover, the advancing of a loaded container away from the loading station, the advancing of an empty container to the loading station, the elevating of such container to the chute outlet, and the releasing of blocked articles.

23. A method as in claim 14, wherein orienting the articles at the loading station further comprises:
   establishing within the container, between and transverse to the side plates, a second magnetic field of sufficient strength relative to the weight and material of the articles and to the conditions of their advancement from the chute to a rest position within the container, to maintain lateral orientation of the articles therealong, said magnetic field being insufficiently inductive of magnetism causing repelling between articles that such articles rest in contact with each other under the force of gravity.

24. A method as in claim 23, wherein orienting at the loading station further comprises:
   biasing the second magnetic field at least partially away from the slidable cover thereby avoiding pressure therealong from loaded articles when the container is lowered to the first elevation.

25. A method as in claim 23, further comprising:

vibrating the container as articles are introduced therein, thereby compactly positioning the articles therewithin.

26. A method as in claim 25, wherein each article includes a generally central, body portion having a first end and a second end, further comprising:

spacing the first and second side plate of the container sufficiently apart to accommodate at least one article and a body of another article therebetween such that, when at least three layers of articles occur, each article in a second layer lies upon a lead of an article in a first layer with the first ends of the bodies in the second layer facing the second ends of the bodies of the first layer and each body of an article in a third layer lies upon two leads of articles in the second layer, such body also lying substantially along a plane passing between two bodies in the first layer.

27. A method as in claim 26, further comprising:

biasing the second magnetic field in an unsymmetrical manner with regard to a longitudinal centerplane taken through the bottom plate and the cover of a container; and vibrating the container in an unsymmetrical manner with regard to a longitudinal centerplane taken through the bottom plate and the cover of a container.

* * * * *